(12) United States Patent
Takemasa (10) Patent No.: US 12,025,815 B2
(45) Date of Patent: Jul. 2, 2024

(54) DISPLAY DEVICE INCLUDING FIRST AND SECOND DISPLAY PANELS

(71) Applicant: Japan Display Inc., Tokyo (JP)

(72) Inventor: Kenichi Takemasa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/363,958

(22) Filed: Aug. 2, 2023

(65) Prior Publication Data
US 2024/0045228 A1 Feb. 8, 2024

(30) Foreign Application Priority Data
Aug. 4, 2022 (JP) .................. 2022-124827

(51) Int. Cl.
*G02B 30/56* (2020.01)
*G06F 3/0354* (2013.01)
*G06F 3/038* (2013.01)
*G06F 3/044* (2006.01)
*G09G 3/20* (2006.01)

(52) U.S. Cl.
CPC ......... *G02B 30/56* (2020.01); *G06F 3/03543* (2013.01); *G06F 3/038* (2013.01); *G06F 3/044* (2013.01); *G09G 3/20* (2013.01); *G06F 2203/04108* (2013.01); *G09G 2300/023* (2013.01); *G09G 2320/0686* (2013.01); *G09G 2354/00* (2013.01)

(58) Field of Classification Search
CPC ..... G02B 30/56; G06F 3/03543; G06F 3/038; G06F 3/044; G06F 2203/04108; G06F 3/041; G06F 3/042; G09G 3/20; G09G 2300/023; G09G 2320/0686; G09G 2354/00
See application file for complete search history.

(56) References Cited

U.S. PATENT DOCUMENTS

| | | | |
|---|---|---|---|
| 2001/0022563 A1 | 9/2001 | Ishikawa | |
| 2003/0095079 A1* | 5/2003 | Ishikawa | G03B 15/10 345/6 |
| 2010/0245345 A1* | 9/2010 | Tomisawa | H04N 13/393 345/419 |

* cited by examiner

*Primary Examiner* — Rodney Amadiz
(74) *Attorney, Agent, or Firm* — Maier & Maier, PLLC (57) ABSTRACT

According to one embodiment, a display device includes a first display panel including a first display surface, a second display panel opposed to the first display panel, configured to transmit image light emitted from the first display surface, and including a second display surface on a side opposite to a side opposed to the first display surface, and an imaging optical element located between the first display panel and the second display panel, and generating in space an imaging plane where the image light is imaged.

9 Claims, 12 Drawing Sheets

DISPLAY DEVICE INCLUDING FIRST AND SECOND DISPLAY PANELS

CROSS-REFERENCE TO RELATED APPLICATIONS

This application is based upon and claims the benefit of priority from Japanese Patent Application No. 2022-124827, filed Aug. 4, 2022, the entire contents of which are incorporated herein by reference.

FIELD

Embodiments described herein relate generally to a display device.

BACKGROUND

An image display device comprising a display unit for displaying two-dimensional images and a microlens array in combination to display real two-dimensional images in space on an opposite side of a display unit with respect to the microlens array has been proposed, as an example of display devices.

Recently, a display device having a plurality of display surfaces in a depth direction has been required.

DETAILED DESCRIPTION

Embodiments described herein aim to provide a display device capable of forming a plurality of display surfaces in a depth direction.

In general, according to one embodiment, a display device comprises a first display panel including a first display surface, a second display panel opposed to the first display panel, configured to transmit image light emitted from the first display surface, and including a second display surface on a side opposite to a side opposed to the first display surface, and an imaging optical element located between the first display panel and the second display panel, and generating in space an imaging plane where the image light is imaged.

According to the embodiments, a display device capable of forming a plurality of display surfaces in a depth direction can be provided.

Embodiments will be described hereinafter with reference to the accompanying drawings.

The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. In addition, in the specification and drawings, structural elements which function in the same or a similar manner to those described in connection with preceding drawings are denoted by like reference numbers, detailed description thereof being omitted unless necessary.

Figure 1:
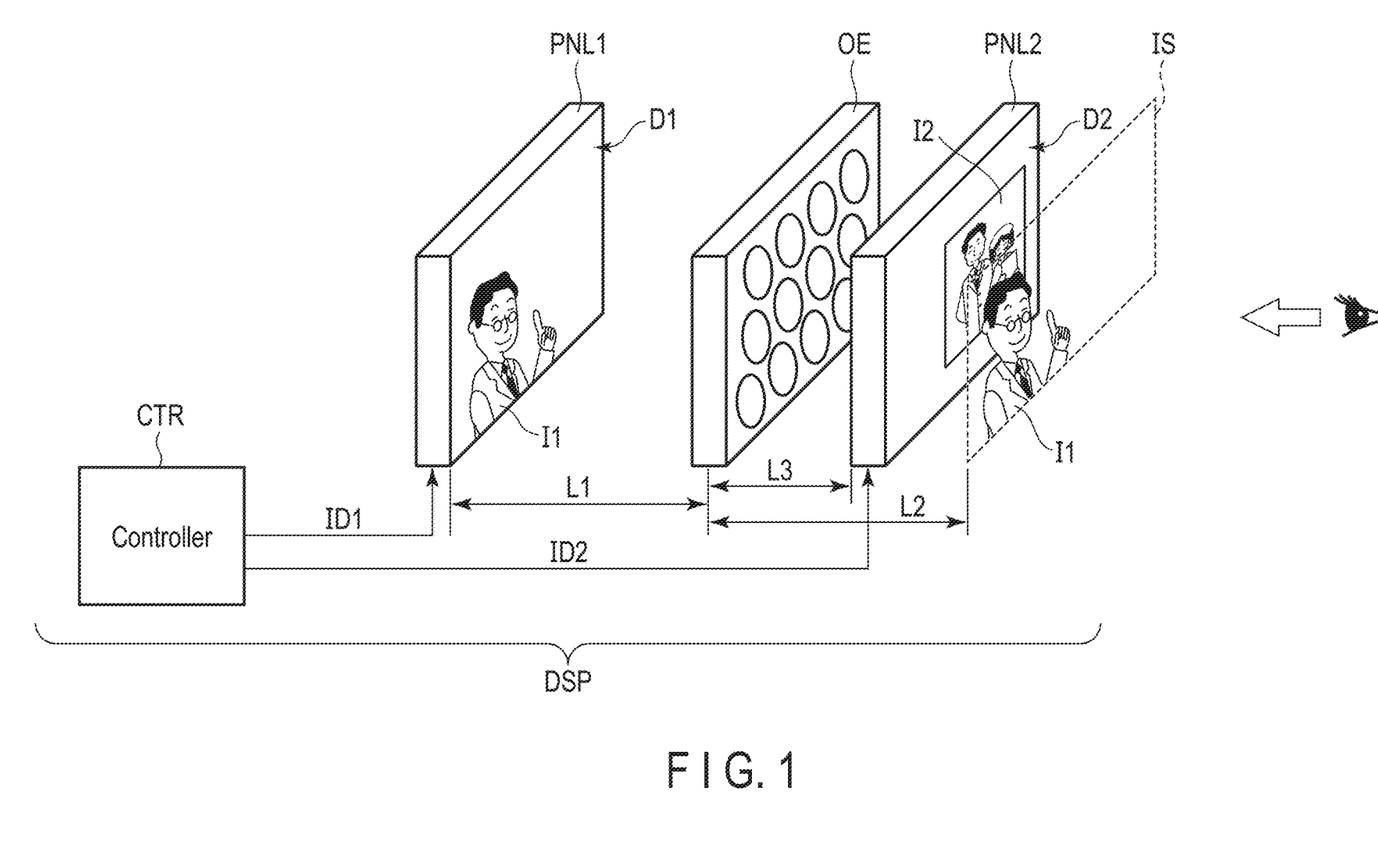
FIG. 1 is a view showing a configuration example of a display device DSP.

FIG. 1 is a view showing a configuration example of a display device DSP.

The display device DSP comprises a first display panel PNL1, an imaging optical element OE, and a second display panel PNL2. The second display panel PNL2 is opposed to the first display panel PNL1. The imaging optical element OE is located between the first display panel PNL1 and the second display panel PNL2. A direction in which the first display panel PNL1, the imaging optical element OE, and the second display panel PNL2 are arranged is referred to as a depth direction of the display device DSP.

As for the first display panel PNL1, a display device configured to emit image light, such as a liquid crystal display device, an organic electroluminescent (EL) display device, or an LED display device, can be applied. Such a first display panel PNL1 has a first display surface D1 on a side opposed to the imaging optical element OE, and functions as a light source which emits image light toward the imaging optical element OE.

The second display panel PNL2 is a so-called transparent display device, and is configured such that a user can visually recognize a background of the second display panel PNL2 when observing the second display panel PNL2. In other words, the second display panel PNL2 is configured to transmit the image light emitted from the first display surface D1, and has a second display surface D2 on a side opposite to the side opposed to the first display surface D1.

As for such a second display panel PNL2, a display device comprising a plurality of light emitting diodes on a substrate and having a translucent area between the adjacent light emitting diodes (for example, a display device disclosed in JP 2021-89356 A), a display device comprising a plurality of organic EL elements on a substrate and having a translucent area adjacent to the organic EL elements (for example, a display device disclosed in JP 2016-207486 A), a display device comprising a polymer dispersed liquid crystal layer (for example, a display device disclosed in JP 2020-91400 A), and the like can be applied.

The imaging optical element OE is constitute by, for example, a microlens array. Such an imaging optical element OE generates an imaging plane IS on which the image light transmitted through the second display panel PNL2 is imaged, in space. For example, a distance L1 between the first display panel PNL1 and the imaging optical element OE is equal to a distance L2 between the imaging optical element OE and the imaging plane IS (L1=L2), and an erect equal-magnification image of the image on the first display surface D1 is formed on the imaging plane IS. In other words, the imaging plane IS corresponds to a display surface equivalent to the first display surface D1.

The second display panel PNL2 is located between the imaging optical element OE and the imaging plane IS. Alternatively, a distance L3 between the imaging optical element OE and the second display panel PNL2 is smaller than the distance L1 between the first display panel PNL1 and the imaging optical element OE (L1>L3). In addition, the second display panel PNL2 is arranged substantially parallel to the imaging plane IS.

The first display panel PNL1 and the second display panel PNL2 are connected to a controller CTR. The controller CTR outputs image data ID1 corresponding to an image which is to be displayed on the first display surface D1, to the first display panel PNL1. The controller CTR outputs image data ID2 corresponding to an image which is to be displayed on the second display surface D2, to the second display panel PNL2.

In the display device DSP having such a configuration, an image I1 is displayed on the first display surface D1 in response to outputting the image data ID1 to the first display panel PNL1 by the controller CTR. Image light of the image I1 is transmitted through the second display panel PNL2 and is imaged on the imaging plane IS by the imaging optical element OE. In other words, the same image I1 as that on the first display surface D1 is formed on the imaging plane IS closer to the user side than the second display panel PNL2. The image I1 formed on the imaging plane IS corresponds to a real image of the image I1 displayed on the first display surface D1.

An image I2 is displayed on the second display surface D2 in response to outputting the image data ID2 to the second display panel PNL2 by the controller CTR. The user can thereby visually recognize the image I1 on the imaging plane IS and the image I2 on the second display surface D2. Then, since the imaging plane IS and the second display surface D2 are separated from each other in the depth direction of the display device DSP, a two-layer display surface can be formed in the depth direction.

In the above example, the image I1 on the first display panel PNL1 and the image I2 on the second display panel PNL2 are displayed simultaneously, but either of the image I1 and the image I2 may be displayed.

Figure 2:
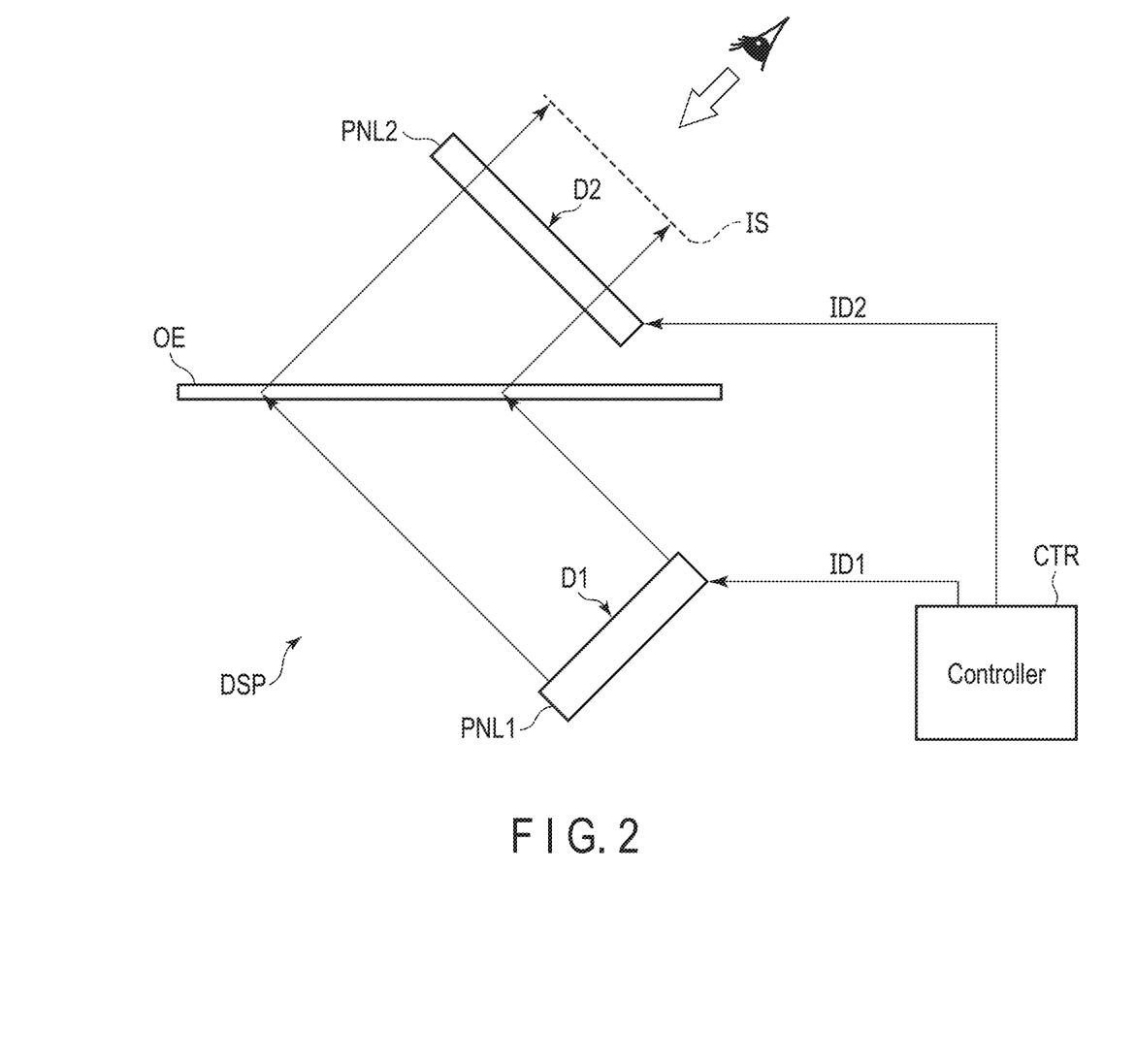
FIG. 2 is a view showing another configuration example of the display device DSP.

FIG. 2 is a view showing another configuration example of the display device DSP.

The configuration example shown in FIG. 2 is different from the configuration example shown in FIG. 1 in that the imaging optical element OE is a mirror array.

The above display device can be applied as the first display panel PNL1. The first display panel PNL1 is arranged to be inclined to the imaging optical element OE.

The above transparent display device can be applied as the second display panel PNL2. The second display panel PNL2 is located between the imaging optical element OE and the imaging plane IS, inclined to the imaging optical element OE, and arranged substantially parallel to the imaging plane IS.

The imaging optical element OE is, for example, an aerial imaging (AI) plate, and the image light emitted from the first display surface D1 is transmitted through and reflected on the AI plate. A real image of the image displayed on the first display surface D1 is thereby formed on the imaging plane IS.

In such a display device DSP, too, when the controller CTR outputs the image data ID1 to the first display panel PNL1 and when the controller CTR outputs the image data ID2 to the second display panel PNL2, the user can visually recognize the image on the imaging plane IS and the image on the second display surface D2. Then, since the imaging plane IS and the second display surface D2 are separated from each other in the depth direction of the display device DSP, a two-layer display surface can be formed in the depth direction.

Figure 3:
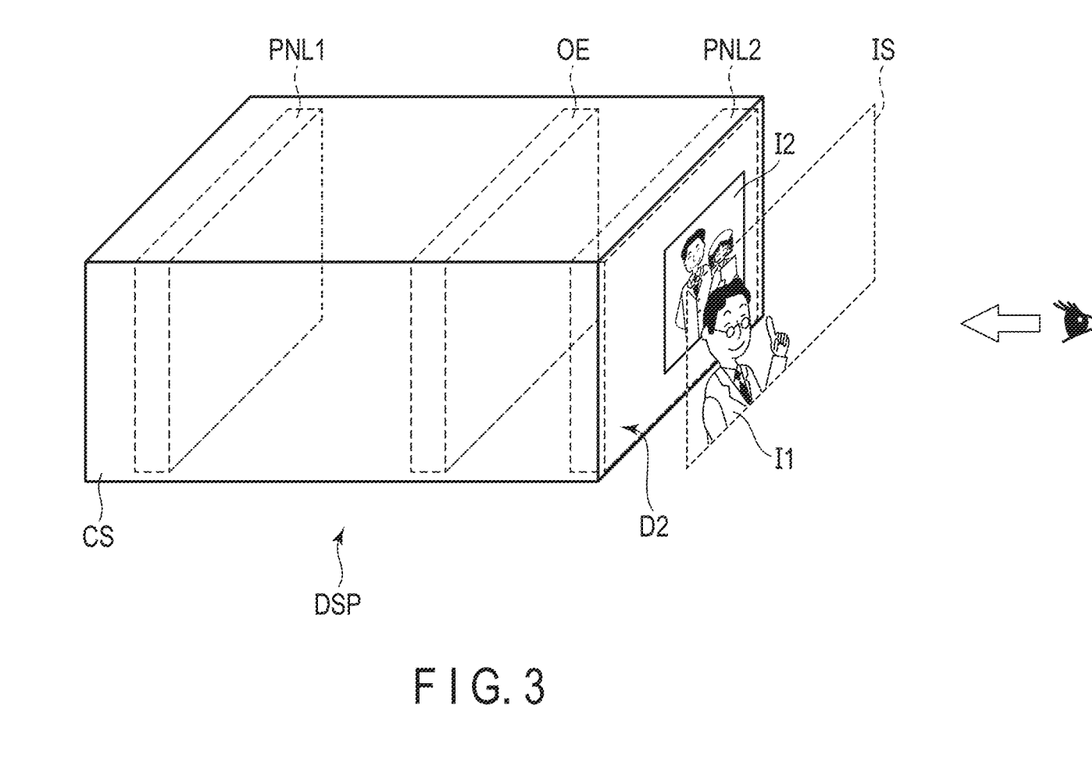
FIG. 3 is a view showing yet another configuration example of the display device DSP.

FIG. 3 is a view showing yet another configuration example of the display device DSP.

The display device DSP further comprises a casing CS in the configuration example shown in FIG. 1. The casing CS surrounds the first display panel PNL1, the imaging optical element OE, and the second display panel PNL2, and exposes the second display surface D2. Space from the first display panel PNL1 to the second display panel PNL2 is thereby shielded from light.

Therefore, when the user observes the second display surface D2 and the imaging plane IS, the visibility of the imaging optical element OE located behind the second display panel PNL2 can be reduced.

In addition, since the background of the second display panel PNL2 is shielded from the light, the background of the second display panel PNL2 is black, and a non-display area (i.e., an area where the background of the second display panel PNL2 is visually recognized) can be displayed as back on the second display panel PNL2. For this reason, the contrast ratio of the image I2 displayed on the second display panel PNL2 can be improved and the visibility of the image I2 can be improved as compared with a case where external light is made incident on the second display panel PNL2.

Figure 4:
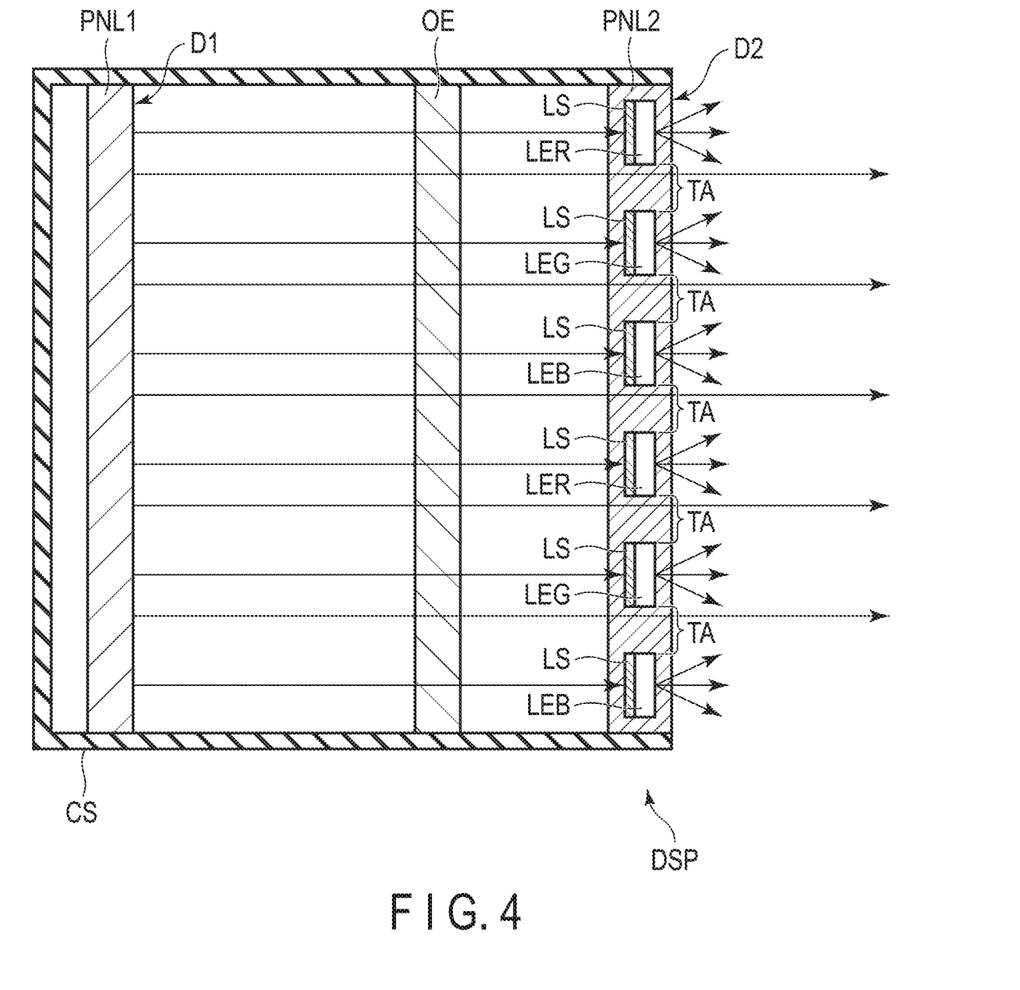
FIG. 4 is a view showing a modified example of the display device DSP shown in FIG. 3.

FIG. 4 is a view showing a modified example of the display device DSP shown in FIG. 3.

The second display panel PNL2 comprises a plurality of light emitting elements LE and light shielding layers LS. The plurality of light emitting elements LE are arranged on a transparent substrate constituting the second display panel PNL2.

The plurality of light emitting elements LE include, for example, light emitting elements LER emitting red light, light emitting elements LEG emitting green light, and light emitting elements LEB emitting blue light. Such light emitting elements LE are, for example, light emitting diodes or organic EL elements. Light emitted from these light emitting elements LE forms images displayed on the second display surface D2. A transmissive area TA where the image light emitted from the first display surface D1 is transmitted is formed between adjacent light emitting elements LE.

The light shielding layer LS is located on a side opposed to the imaging optical element OE of each of the light emitting elements LE. The light shielding layer LS may be arranged between the transparent substrate and the light emitting element LE to be in contact with the light emitting element LE, may be separated from the light emitting element LE, or may be an electrode (for example, an anode) constituting the light emitting element LE.

Such a light shielding layer LS may be formed of a conductive material or an insulating material. In addition, the light shielding layer LS may be formed of an inorganic material or an organic material. As an example, the light shielding layer LS is desirably a black layer having an extremely small reflectance. The light shielding layer LS blocks light traveling toward the imaging optical element OE, of the light emitted from the light emitting element LE.

In addition, the light shielding layer LS prevents reflection of the image light emitted from the first display surface D1 to the imaging optical element OE.

Therefore, a light shielding property inside the casing CS can be improved and the visibility of the imaging optical element OE can be further reduced. In addition, the contrast ratio of the image I2 displayed on the second display panel PNL2 can be further improved.

Figure 5:
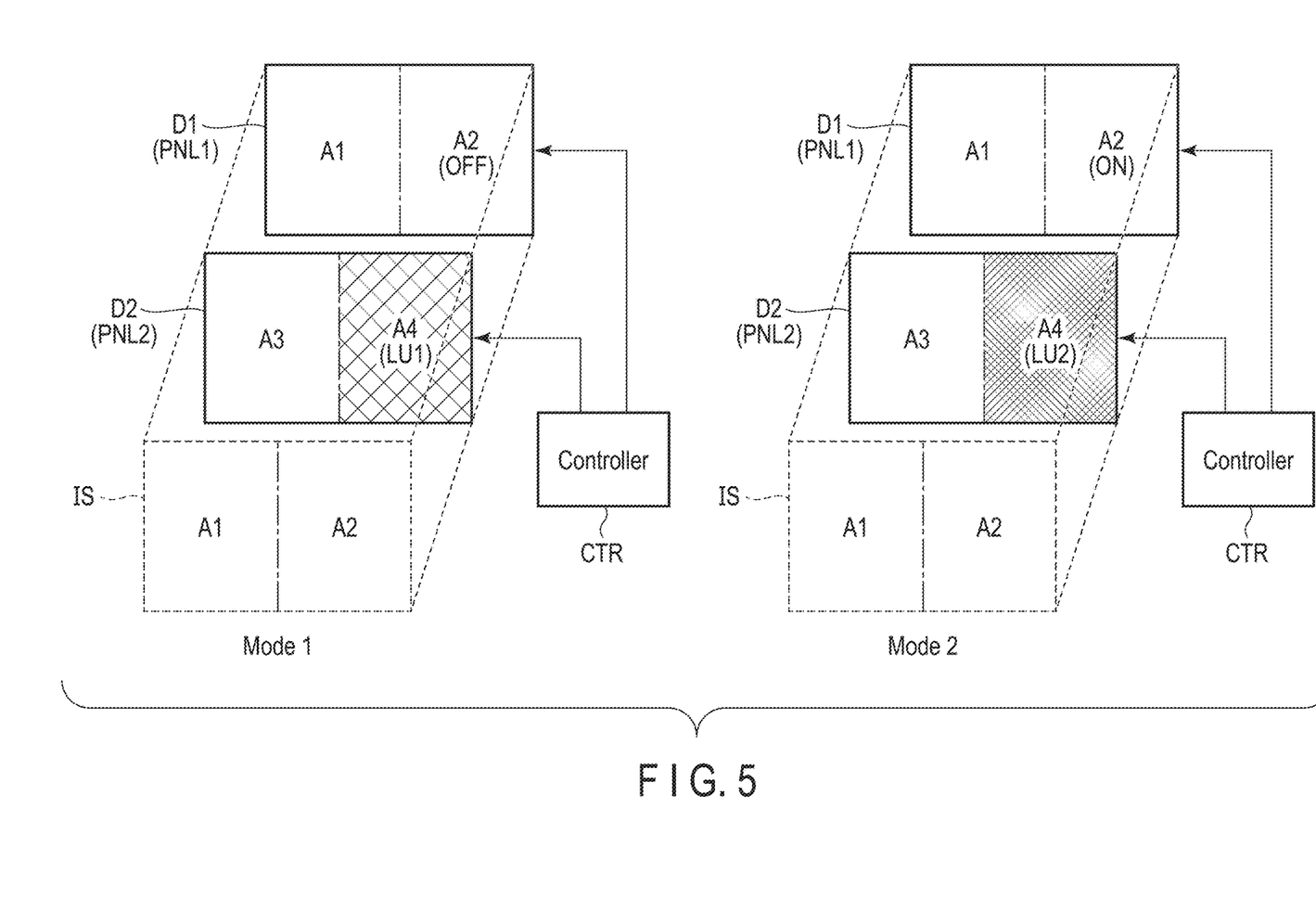
FIG. 5 is a view illustrating an example of control of the display device DSP.

FIG. 5 is a view illustrating an example of control of the display device DSP.

For example, in the display device DSP shown in FIG. 1, the controller CTR has a plurality of modes to control the first display panel PNL1 and the second display panel PNL2. These modes will be described below.

The first display surface D1 of the first display panel PNL1 has a first area A1 and a second area A2. The imaging plane IS also has a first area A1 and a second area A2 corresponding to the first display surface D1. The second display surface D2 of the second display panel PNL2 has a third area A3 and a fourth area A4. The third area A3 overlaps the first area A1. The fourth area A4 overlaps the second area A2.

An example of control of the second area A2 and the fourth area A4 overlapping each other will be described here.

An off state in which no images are displayed in the second area A2 is referred to as a first mode. As shown at the left side of the figure, the controller CTR sets the fourth area A4 to first luminance LU1, in a first mode (Mode 1).

An on state in which images are displayed in the second area A2 is referred to as a second mode. As shown at the right side of the figure, the controller CTR sets the fourth area A4 to second luminance LU2, in a second mode (Mode 2). The second luminance LU2 is smaller than the first luminance LU1. Alternatively, the controller CTR sets the off state in which no images are displayed in the fourth area A4, in the second mode.

Figure 6:
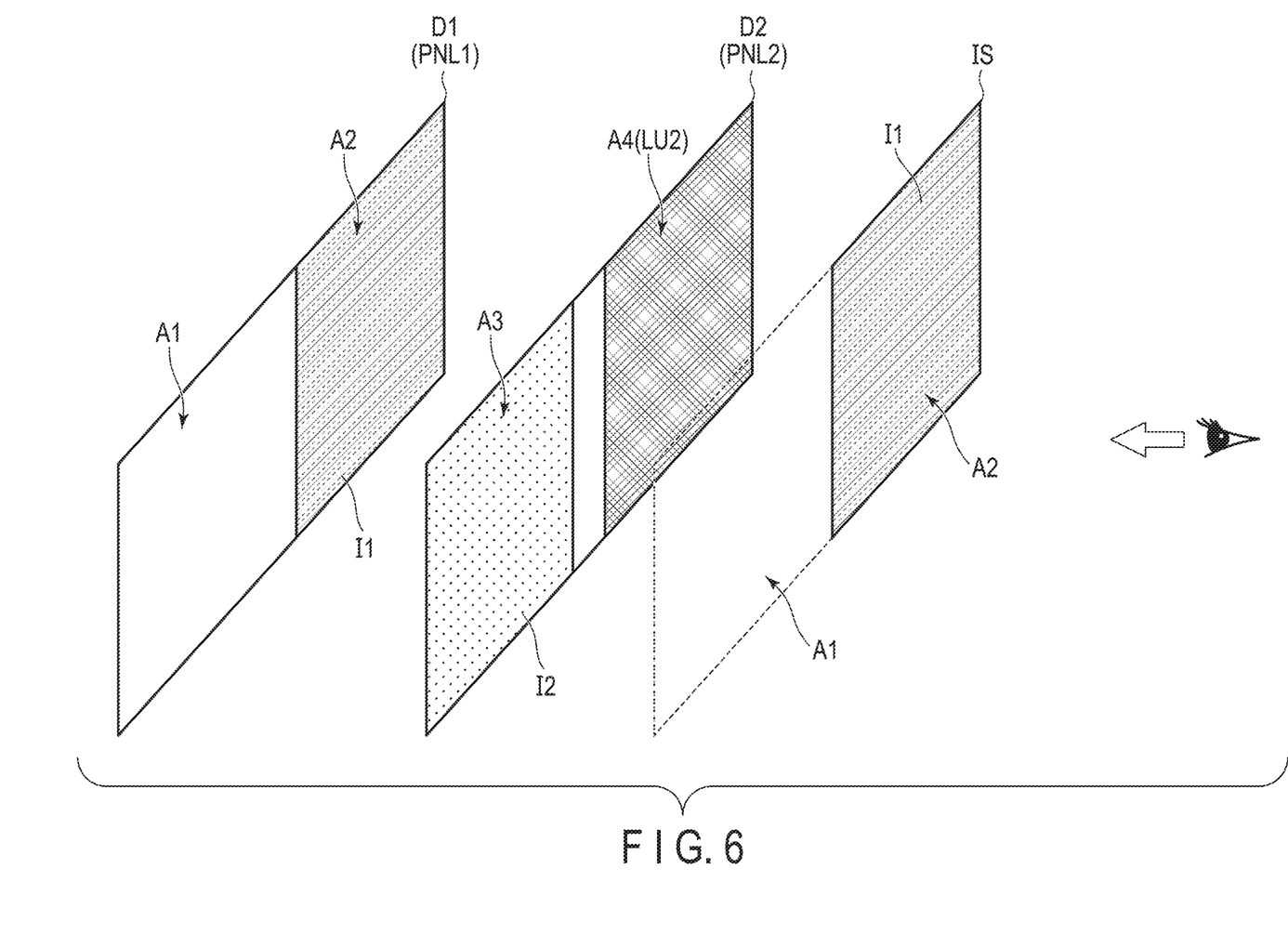
FIG. 6 is a view illustrating the second mode.

FIG. 6 is a view illustrating the second mode.

The luminance of the fourth area A4 is set to the second luminance LU2, in the second mode in which the image I1 is displayed in the second area A2. Therefore, when the user observes the display device DSP, the visibility of the image I1 displayed in the second area A2 on the imaging plane IS can be improved. Furthermore, the visibility of the image I1 can be further improved in the off state in which no images are displayed in the fourth area A4.

In addition, when the image I2 is displayed in the third area A3, the user can observe the image I1 on the imaging plane IS and the image I2 on the second display surface D2, at positions different in the depth direction of the display device DSP.

Figure 7:
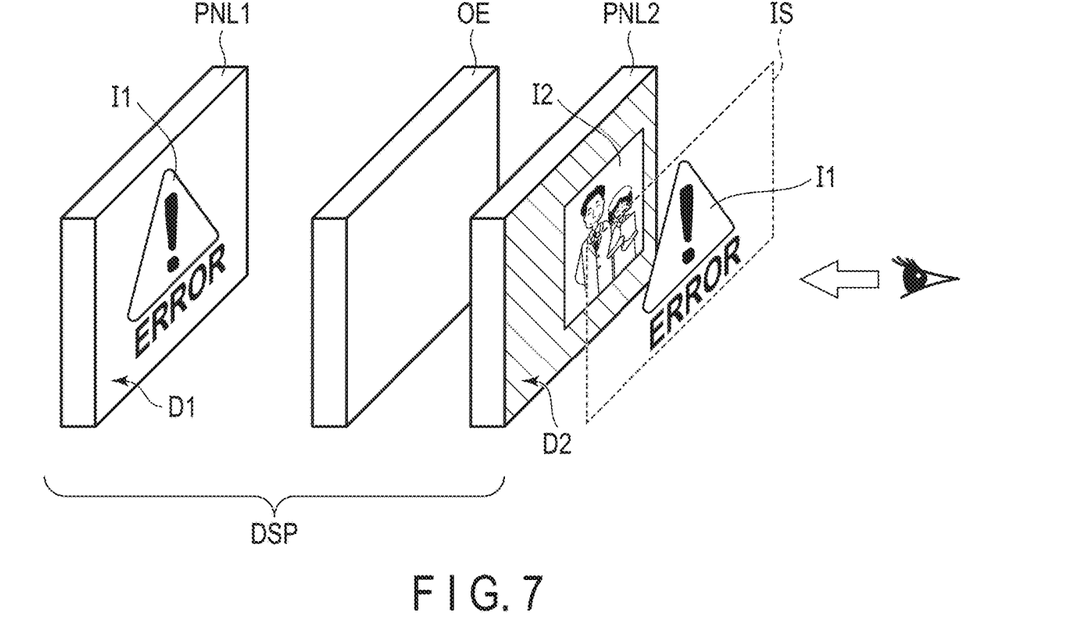
FIG. 7 is a view illustrating an example of use of the display device DSP.

FIG. 7 is a view illustrating an example of use of the display device DSP.

When the display device DSP is generally used, the image I2 is displayed on the second display surface D2 of the second display panel PNL2, and no images are displayed on the first display surface D1 of the first display panel PNL1 or the imaging plane IS.

When an image including information of which the user should be notified (error information, breaking news, disaster information, and the like) is displayed, this image is displayed on the first display surface D1 of the first display panel PNL1 as the image I1. Therefore, the image I1 is displayed on the imaging plane IS on the user side, over the displayed image I2, and the user's attention can be attracted.

Figure 8:
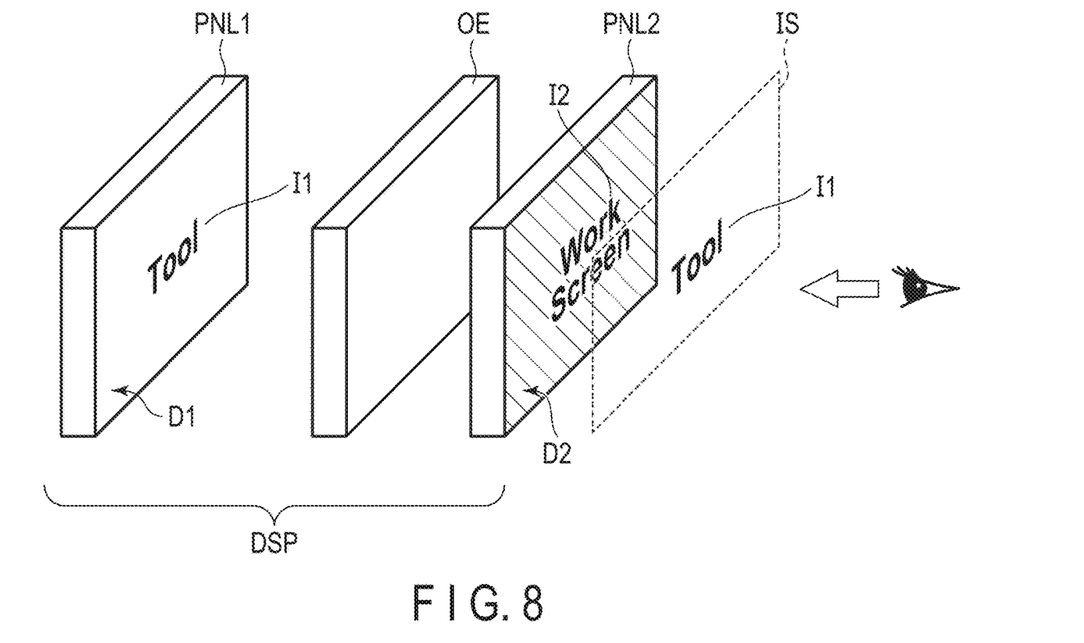
FIG. 8 is a view illustrating another example of use of the display device DSP.

FIG. 8 is a view illustrating another example of use of the display device DSP.

A work screen is displayed as the image I2, on the second display surface D2 of the second display panel PNL2. In addition, palettes of tools necessary for the work are displayed as the images I1, on the first display surface D1 of the first display panel PNL1 and the imaging plane IS.

Thus, the convenience can be improved by displaying the work screen and the tools at the positions different in the depth direction.

Figure 9:
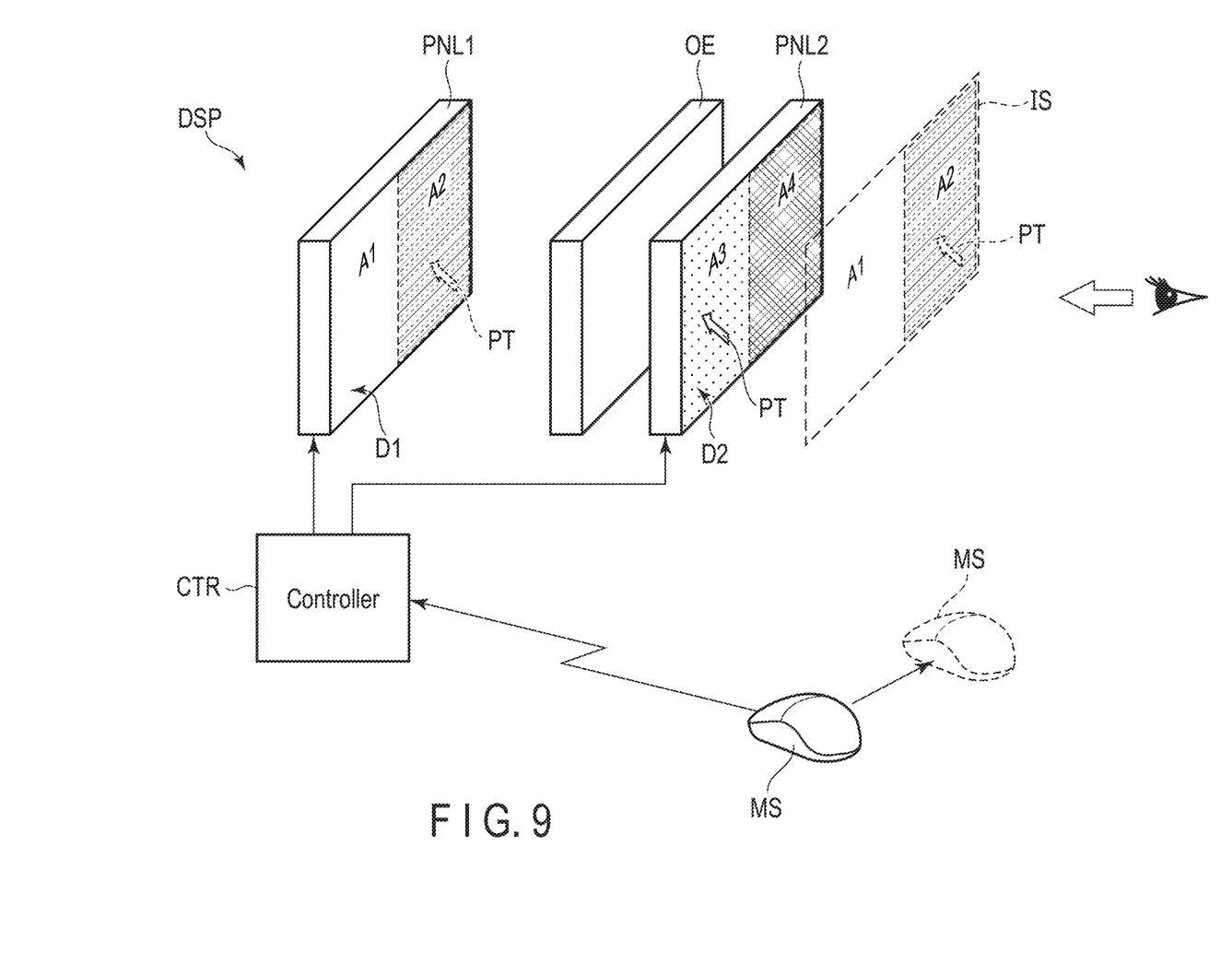
FIG. 9 is a view showing yet another configuration example of the display device DSP.

FIG. 9 is a view showing yet another configuration example of the display device DSP.

The display device DSP further comprises a mouse MS in the configuration example shown in FIG. 1. The mouse MS is an input device for accepting an operation input corresponding to a position of a pointer PT displayed on the first display surface D1 and the second display surface D2.

The mouse MS is configured to be communicable with the controller CTR. The controller CTR displays the pointer PT on the first display surface D1 and the second display surface D2, and controls the pointer PT to move in accordance with the movement of the mouse MS. In addition, the controller CTR controls performing the operation corresponding to the position of the pointer PT, based on click of a button of the mouse MS.

It is assumed that, for example, no images are displayed in the first areas A1 and an image is displayed in the second areas A2, in the first display surface D1 and the imaging plane IS and that an image is displayed in the third area A3 and no images are displayed in the fourth area A4, in the second display surface D2.

In this case, the position of the pointer PT is configured to move between the second area A2 and the third area A3 in accordance with the movement of the mouse MS, based on control of the controller CTR.

Thus, while observing the images displayed at the positions different in the depth direction at the display device DSP (i.e., the image in the second area A2 and the image in the third area A3), the user can operate these images, and the convenience can be thereby improved.

Figure 10:
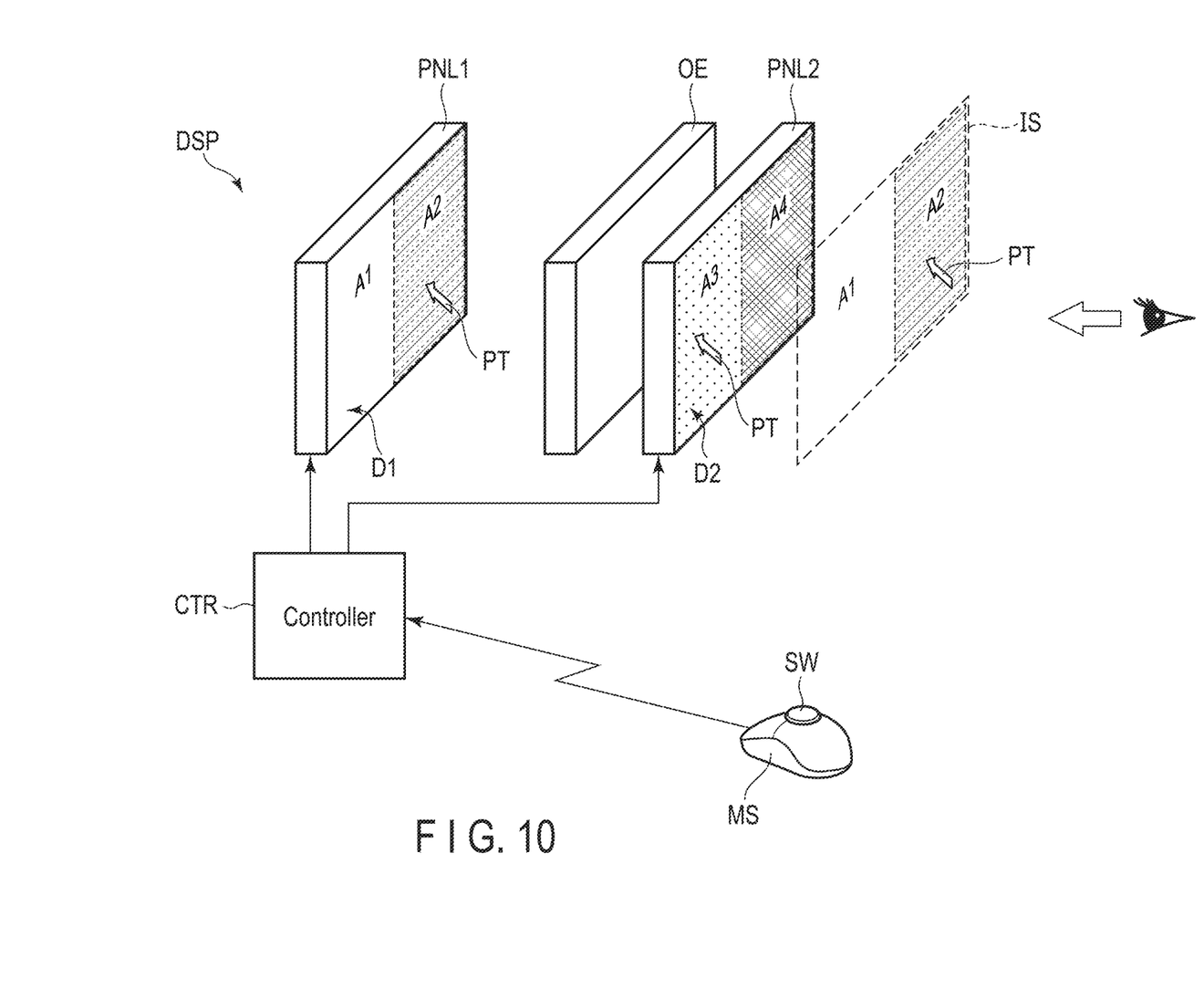
FIG. 10 is a view showing yet another configuration example of the display device DSP.

FIG. 10 is a view showing yet another configuration example of the display device DSP.

The configuration example shown in FIG. 10 is different from the configuration example shown in FIG. 9 in that the mouse MS comprises a switching device SW. The switching device SW accepts input operation to switch the display of the pointer PT between the first display surface D1 and the second display surface D2.

For example, the position of the pointer PT is configured to move to the second display surface D2 based on control of the controller CTR, when the pointer PT is displayed in the first display surface D1 and the input operation of the switching device SW is accepted.

Thus, while observing the images displayed at the positions different in the depth direction at the display device DSP (i.e., the image in the second area A2 and the image in the third area A3), the user can easily switch the operation of these images, and the convenience can be thereby improved.

Figure 11:
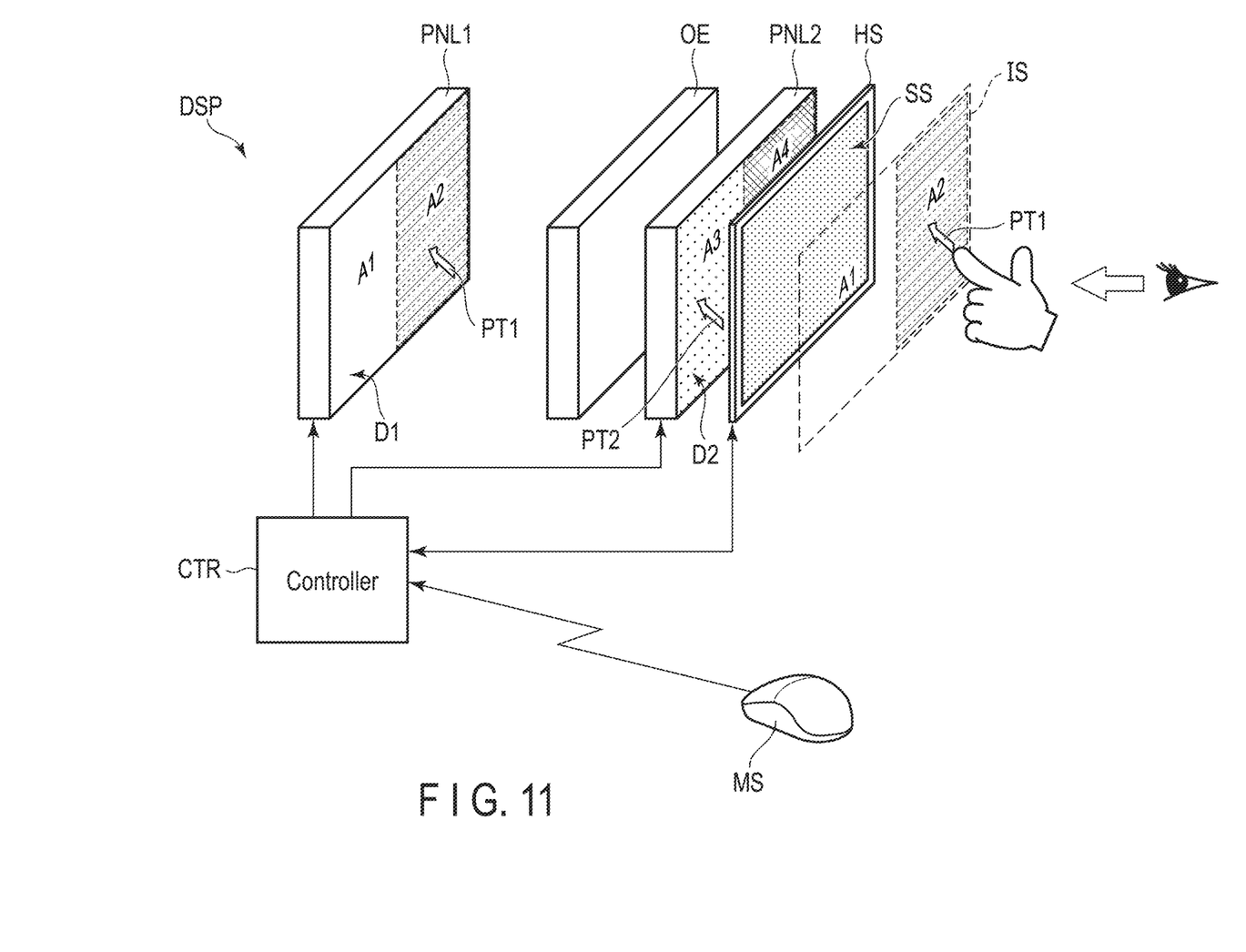
FIG. 11 is a view showing yet another configuration example of the display device DSP.

FIG. 11 is a view showing yet another configuration example of the display device DSP.

The configuration example shown in FIG. 11 is different from the configuration example shown in FIG. 1 in comprising a hover sensor HS including a detection area to detect an object in space.

In the example shown in the figure, the hover sensor HS is located between the second display panel PNL2 and the imaging plane IS and is electrically connected to the controller CTR. The hover sensor HS is, for example, a capacitive touchless sensor. Such a hover sensor HS comprises a sensor surface SS on which a plurality of transparent electrodes are arranged. Image light emitted from each of the first display surface D1 and the second display surface D2 is transmitted through the sensor surface SS. The hover sensor HS includes a detection area in space separated from the sensor surface SS, reads the capacitance varied in response to approach of an object such as a finger to this detection area as a detection signal, and detects the object. The detection area is formed more closely to the imaging plane IS on the user side than the sensor surface SS. For this reason, the hover sensor HS can detect an object such as a user's finger on the imaging plane IS.

In such a configuration example, positions of pointers PT1 displayed on the first display surface D1 and the imaging plane IS are configured to move in accordance with the movement of the object detected by the hover sensor HS, based on control of the controller CTR.

In addition, a position of a pointer PT2 displayed on the second display surface D2 is configured to move in accordance with the movement of the mouse MS, based on control of the controller CTR.

Thus, while observing the images displayed at the positions different in the depth direction at the display device DSP (i.e., the image in the second area A2 and the image in the third area A3), the user can operate these images independently, and the convenience can be thereby improved.

Figure 12:
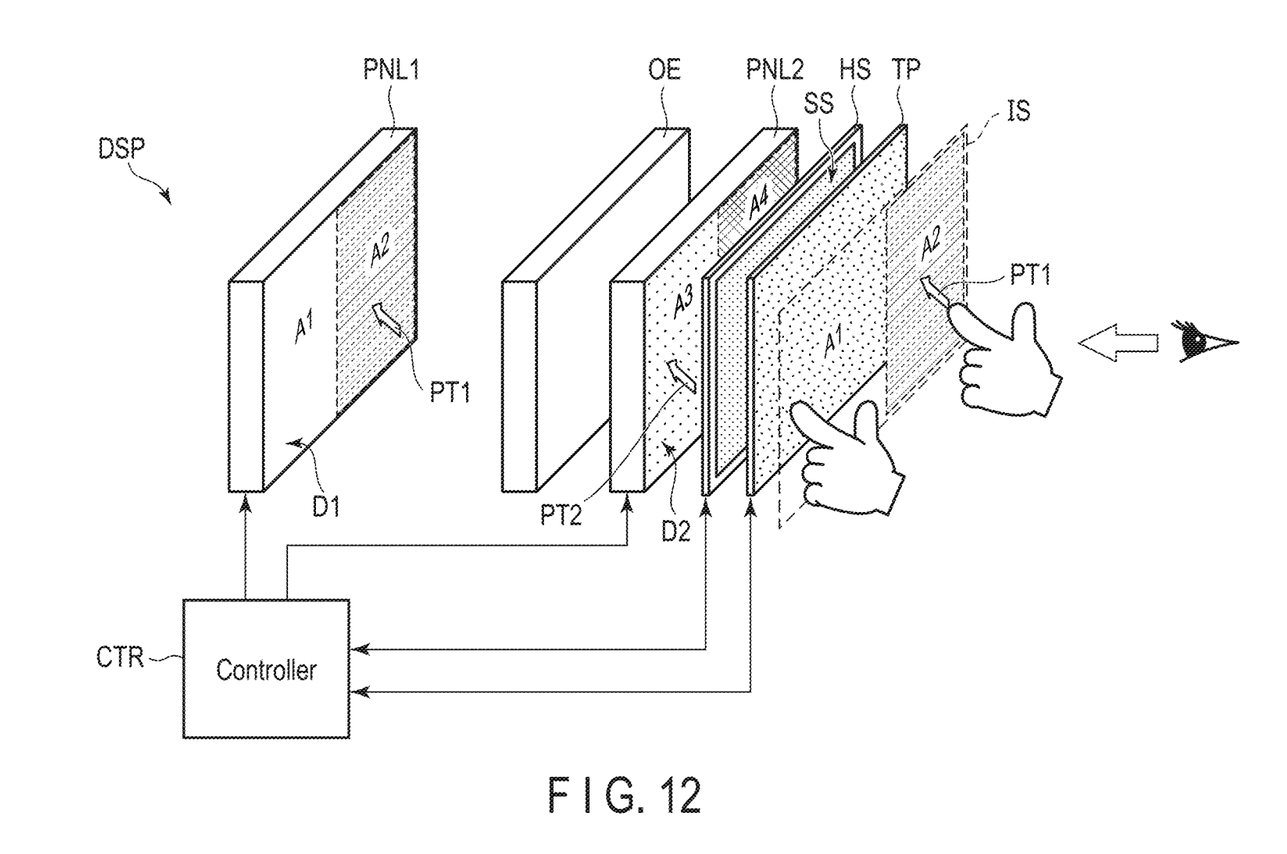
FIG. 12 is a view showing yet another configuration example of the display device DSP.

FIG. 12 is a view showing yet another configuration example of the display device DSP.

The configuration example shown in FIG. 12 is different from the configuration example shown in FIG. 11 in comprising a touch panel TP including a detection area to detect contact of an object.

In the example shown in the figure, the touch panel TP is located between the second display panel PNL2 and the imaging plane IS and is electrically connected to the controller CTR. The touch panel TP may be built in the second display panel PNL2. The touch panel TP is, for example, a capacitive sensor. Such a touch panel TP reads the capacitance varied in response to contact of an object such as a finger on the detection area, and detects the object.

In such a configuration example, the position of the pointer PT2 displayed on the second display surface D2 is configured to move in accordance with the movement of the object detected by the touch panel TP, based on control of the controller CTR.

In addition, in the example shown in the figure, the positions of the pointers PT1 displayed on the first display surface D1 and the imaging plane IS are configured to move in accordance with the movement of the object detected by the hover sensor HS, based on control of the controller CTR. The positions of the pointers PT1 may be configured to move in accordance with the movement of the mouse MS electrically connected to the controller CTR.

Thus, while observing the images displayed at the positions different in the depth direction at the display device DSP (i.e., the image in the second area A2 and the image in the third area A3), the user can operate these images independently, and the convenience can be thereby improved.

As shown in FIG. 12, when the imaging plane IS includes the detection area of the hover sensor HS and is located more closely to the user side than the detection area of the touch panel TP, the detection area of the hover sensor HS is desirably limited to the second area A2 where images are displayed, of the imaging plane IS. Therefore, even if the object in contact with the touch panel TP exists in the first area A1 of the imaging plane IS, the hover sensor HS does not detect this object and can prevent operation errors of the pointer PT1.

Figure 13:
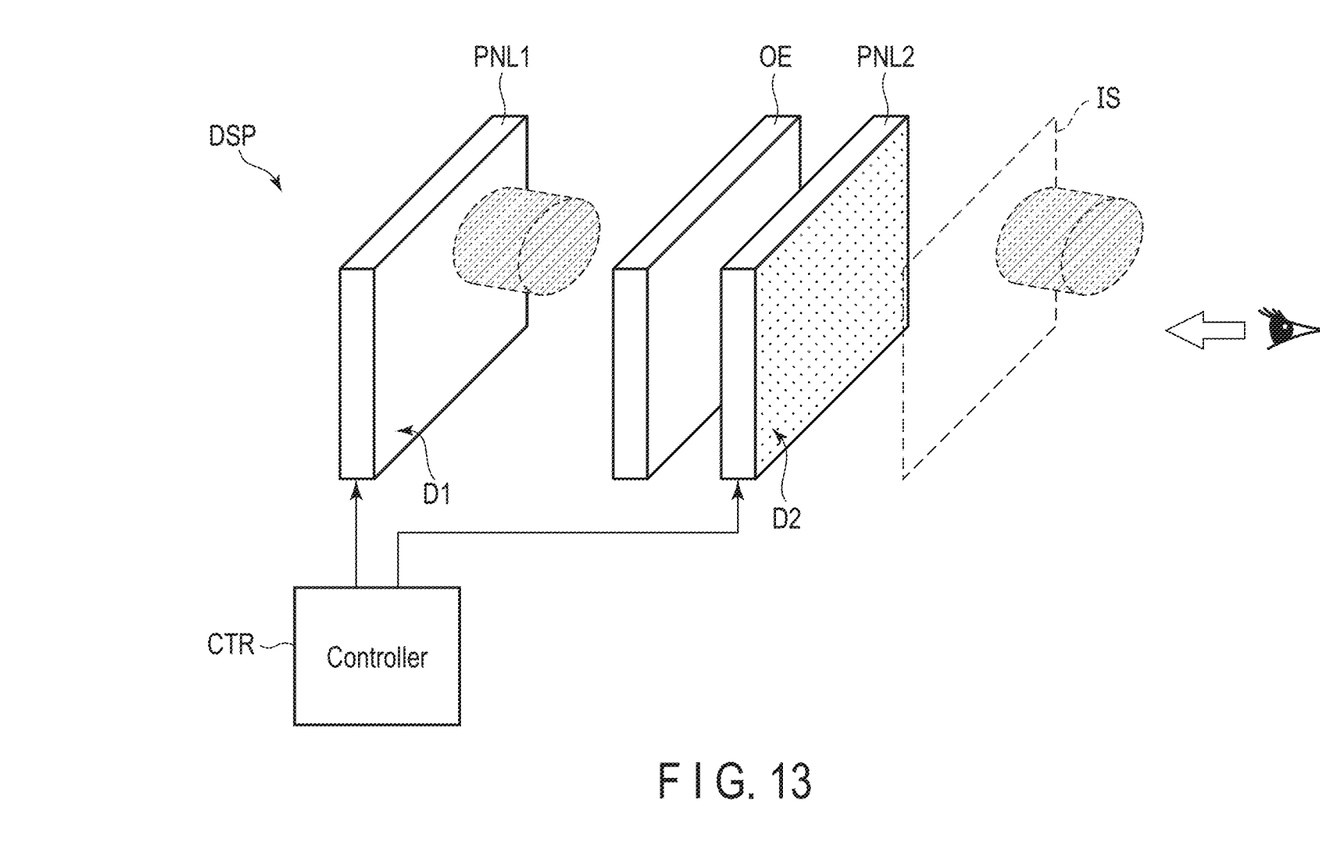
FIG. 13 is a view showing yet another configuration example of the display device DSP.

FIG. 13 is a view showing yet another configuration example of the display device DSP.

The first display panel PNL1 is a light field display configured to implement stereoscopic viewing with the naked eye.

According to such a configuration example, the user can observe a two-dimensional image displayed on the second display panel PNL2 and a three-dimensional image formed on the imaging plane IS.

As described above, according to embodiments, a display device capable of forming a plurality of display surfaces in a depth direction can be provided.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:
1. A display device comprising:
a first display panel including a first display surface;
a second display panel opposed to the first display panel, configured to transmit image light emitted from the first display surface, and including a second display surface on a side opposite to a side opposed to the first display surface; and
an imaging optical element located between the first display panel and the second display panel, and generating in space an imaging plane where the image light is imaged, wherein
the second display panel comprises a plurality of light emitting elements, and a light shielding layer located on a side opposed to the imaging optical element of each of the plurality of light emitting elements.
2. The display device of claim 1, wherein
the second display panel is located between the imaging optical element and the imaging plane.
3. The display device of claim 1, further comprising:
a casing surrounding the first display panel, the imaging optical element, and the second display panel, and exposing the second display surface.
4. The display device of claim 1, further comprising:
a hover sensor including a detection area for detecting an object in space, wherein
the detection area is formed on the imaging plane.

5. The display device of claim 1, further comprising:
a touch panel including a detection area for detecting contact of an object.

6. A display device comprising:
a first display panel including a first display surface;
a second display panel opposed to the first display panel, configured to transmit image light emitted from the first display surface, and including a second display surface on a side opposite to a side opposed to the first display surface; and
an imaging optical element located between the first display panel and the second display panel, and generating in space an imaging plane where the image light is imaged, wherein
the first display surface includes a first area and a second area,
the second display surface includes a third area overlapping the first area, and a fourth area overlapping the second area,
the fourth area is set to first luminance in a first mode in which an image is not displayed in the second area, and
the fourth area is set to second luminance smaller than the first luminance in a second mode in which an image is displayed in the second area.

7. The display device of claim 6, wherein
no images are displayed in the fourth area in the second mode.

8. The display device of claim 6, further comprising:
a mouse accepting an operation input corresponding to a position of a pointer displayed on the first display surface and the second display surface, wherein
the position of the pointer is configured to move between the second area and the third area in accordance with movement of the mouse.

9. A display device comprising:
a first display panel including a first display surface;
a second display panel opposed to the first display panel, configured to transmit image light emitted from the first display surface, and including a second display surface on a side opposite to a side opposed to the first display surface;
an imaging optical element located between the first display panel and the second display panel, and generating in space an imaging plane where the image light is imaged;
a mouse accepting an operation input corresponding to a position of a pointer displayed on the first display surface and the second display surface, wherein
the mouse includes a switching device accepting input to switch the display of the pointer between the first display surface and the second display surface.

* * * * *